(No Model.) 2 Sheets—Sheet 1.
A. BLAKLEY.
CORN PLANTER.
No. 434,758. Patented Aug. 19, 1890.
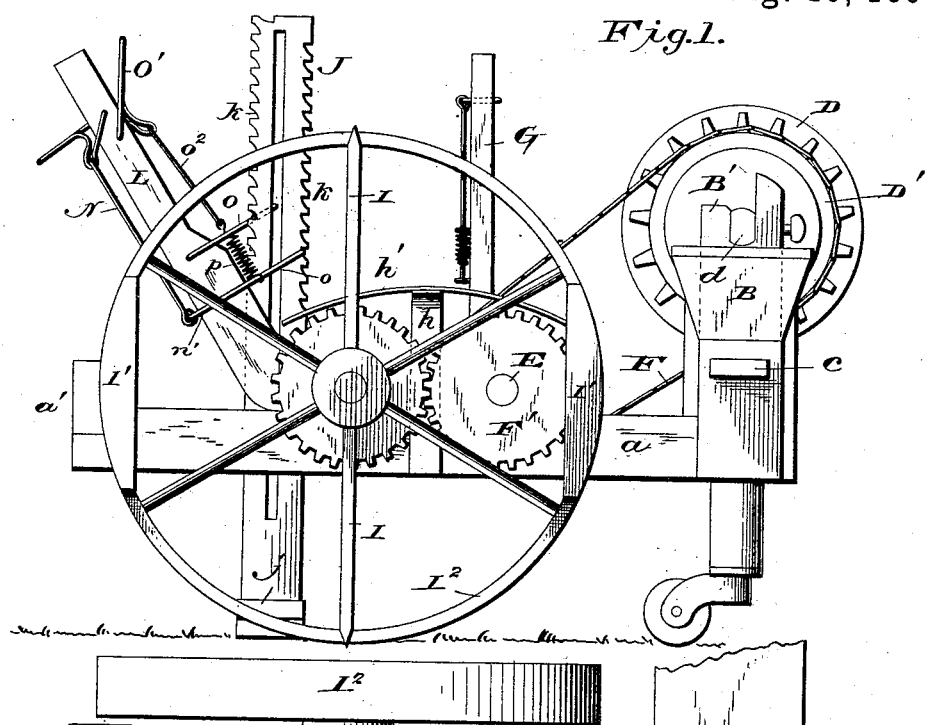
Fig. 1.
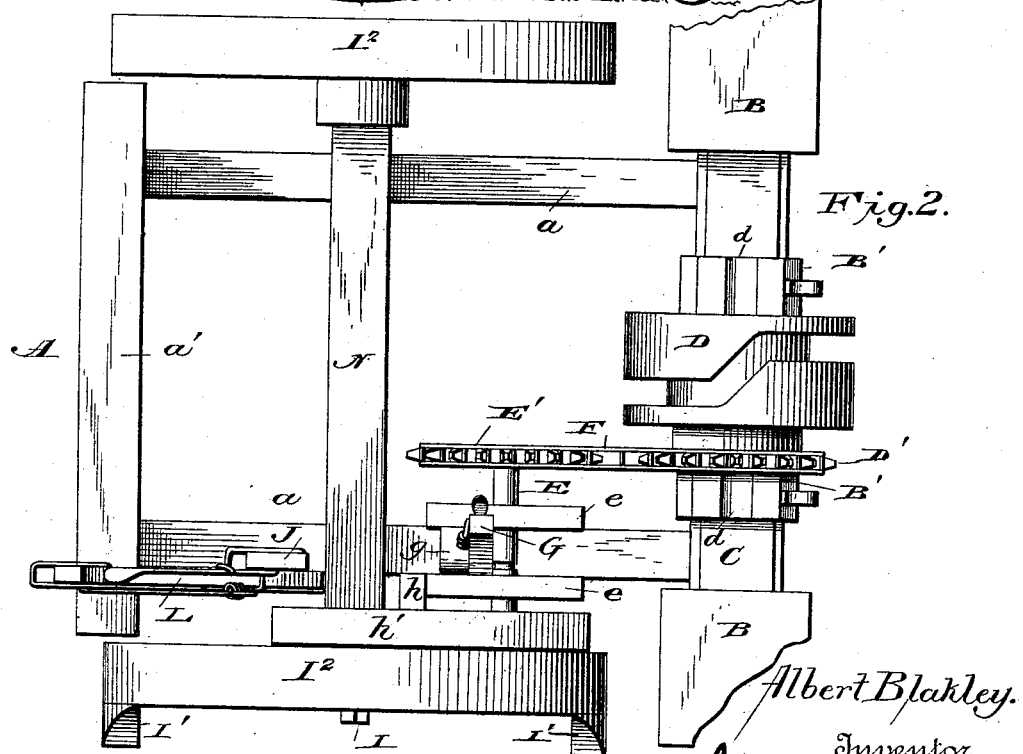
Fig. 2.
Witnesses
Albert Blakley.
Inventor
by 
Attorney (No Model.) 2 Sheets—Sheet 2.
A. BLAKLEY.
CORN PLANTER.
No. 434,758. Patented Aug. 19, 1890.
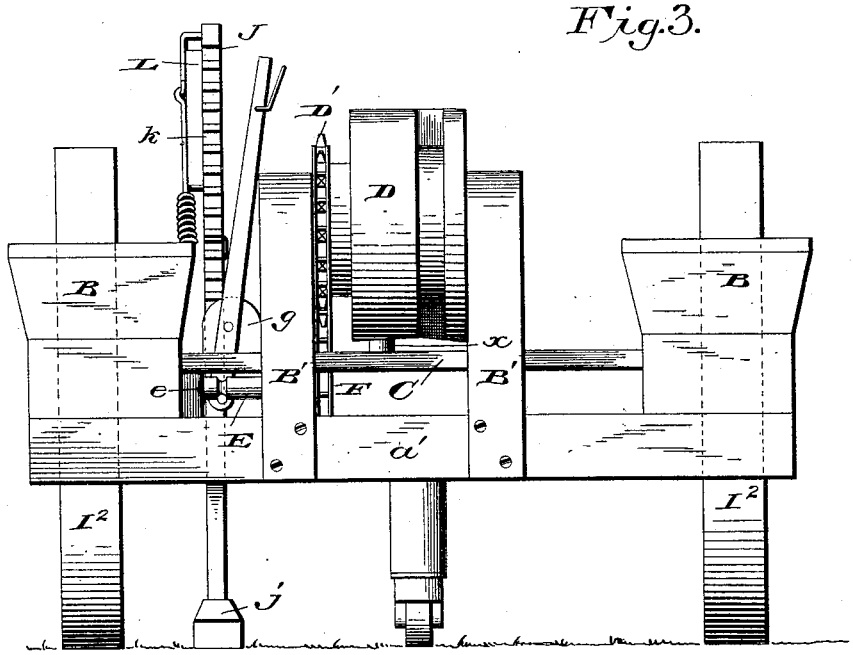
Fig. 3.
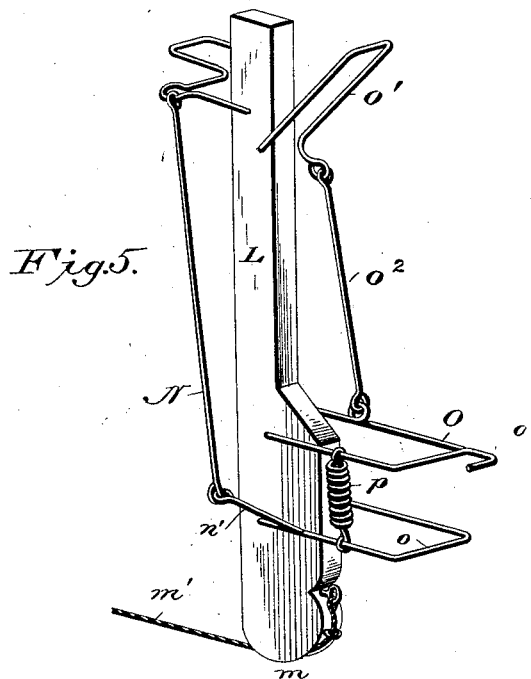
Fig. 5.
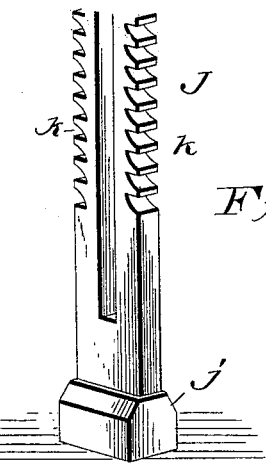
Fig. 4.
Albert Blakley.
Inventor
Witnesses
by
Attorney

UNITED STATES PATENT OFFICE.

ALBERT BLAKLEY, OF KOKOMO, INDIANA.

CORN-PLANTER.

SPECIFICATION forming part of Letters Patent No. 434,758, dated August 19, 1890.

Application filed April 24, 1890. Serial No. 349,344. (No model.)

*To all whom it may concern:*

Be it known that I, ALBERT BLAKLEY, a citizen of the United States of America, residing at Kokomo, in the county of Howard and State of Indiana, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain new and useful improvements in corn-planters; and it consists in the construction and combination of the parts, as will be hereinafter fully set forth, and specifically pointed out in the claims.

The object of my invention is to provide a means whereby a reciprocating seed-slide can be operated from one of the supporting-wheels and thrown into and out of gear therewith, and also in providing the frame of the planter with a vertically-adjustable bar, and a lever for depressing said bar to elevate the driving-wheel, so that it can be adjusted by hand, to the end that the seed will be dropped in unison with the markers attached to said wheel.

In the accompanying drawings, which illustrate my invention, Figure 1 is a side view of a corn-planter constructed in accordance with my improvements. Fig. 2 is a plan view. Fig. 3 is a front elevation; and Figs. 4 and 5 are detail perspective views.

A refers to the frame of the corn-planter, said frame consisting of longitudinal beams $a$ $a$ and front and rear beams $a'$, which are rigidly attached to each other. The front beam $a'$ projects laterally beyond the longitudinal beams, and upon these projecting portions are located the seed-boxes B B, said seed-boxes being provided with openings, through which passes the reciprocating bar or seed-slide C, said seed-slide having the usual perforations through which the seed passes from the boxes.

B' refers to uprights, the lower portions of which are bifurcated and attached to the front cross-beams of the main frame, and the upper portions of these uprights are recessed for the reception of the end of a shaft, upon which the cam D and sprocket-wheel D' are secured. The shaft $d$ is secured at its ends to the uprights B' by set-screws, so that it can be readily removed therefrom when desired, the object of removing the same being to substitute another cam and sprocket-wheel of different dimensions, to change the reciprocation of the seed-slide with respect to the driving-wheel. The cam D and sprocket-wheel D' are rigidly connected to each other and both rotate freely upon the shaft $d$, and the seed-slide C is provided with an upwardly-projecting pin X, having an anti-friction roller mounted thereon, which enters the recess or irregular-shaped groove of the cam D, so as to reciprocate the seed-slide when said cam is rotated.

To the center portion of the front beam of the main frame is attached a caster-wheel, which serves as a support for the front portion of the corn-planter. To one of the longitudinal beams $a$ are attached boxes or bearings $e$ $e$ for the support of the shaft E, which carries at one end the sprocket-wheel E', over which passes a chain F, which connects the same with the sprocket-wheel D'. The opposite end of the shaft E has rigidly attached thereto a cog-wheel F', which meshes with a cog-wheel attached to the inner side of the driving-wheel.

The lever G is pivoted to a block $g$ on one of the beams $a$, and this lever is provided at its lower end with a projecting pin which engages with a recess in the shaft E; so that when said lever is moved to one side the cog-wheel upon the shaft may be thrown in and out of gear. The lever G is provided with a spring-catch for holding the same in a rigid position.

$h$ refers to an upright secured to the main frame, said upright having attached thereto at its upper end a flat curved bar or dirt-guard $h'$, which lies above the cog-wheels so as to prevent the dirt which may be raised from the drive-wheel falling upon said cog-wheels.

One of the supporting-wheels $I^2$ $I^2$ is provided with bars I I, which project slightly beyond the periphery of said wheel, so as to serve as markers, and opposite to these bars said wheel has attached thereto blocks or coverers I', which compress the earth upon the seed after it is planted.

J refers to a bar which is provided at its lower end with a foot j, said bar passing through a slot in the main frame, and is held therein by a pin which passes through a central slot in this bar J, said bar being provided on each side with notches or recesses k, as shown, the object of this bar being to serve as a support for elevating the main driving-wheel when it is desired to adjust the same by hand, and this bar is elevated and depressed by a hand-lever L, as shown in Fig. 5, said hand-lever being curved at its lower end m and provided with a flexible connection m', which is attached to the axle N, upon which the supporting-wheels are journaled. The lever L is provided with a bail o, which passes through the same and encircles the bar J, so that the series of notches at one side of the said bar J will be engaged by said bail. This bail has attached thereto, adjacent to the portion which passes through the lever L, a projecting arm n', the end of which is formed into an eye, to which eye is attached a bar N, connected to a hand-piece pivoted to the upper end of the lever.

O refers to another pivoted bail, which is attached to the lever above the bail o, and this bail O is provided with an end projecting portion o', which engages with notches k on the rear side of the bar, and this bail is connected to the hand-lever O' by a rod $o^2$. The bails o and O are connected to each other by a spiral spring p.

By the construction shown and by properly manipulating the hand-piece of the lever the bails can be thrown into and out of gear with the ratchet-teeth or notches of the bar J, so that it will serve as a bearing upon which to lift the machine from the ground, the bail engagement serving as the connection from which the machine is suspended.

I claim—

1. In a corn-planter, the combination of a reciprocating seed-slide provided with an upwardly-projecting pin which engages with an irregular-shaped groove in a cam-disk, and all located at the front of the planter, said cam having rigidly attached thereto a sprocket-wheel with which engages a chain attached to a sprocket-wheel E', mounted on the shaft E, adjacent to the main axle, and which carries a cog-wheel engaging directly with a cog-wheel attached to the driving-wheel, and a lever for throwing the cog-wheel on shaft E out of gear with the cog-wheel on the driving-shaft and effecting a suspension of the rotation of the sprocket-wheels, their chain, toothed cam, and seed-slide, together with a marking-wheel mounted on the main shaft adjacent to the feed-driving cog-wheel on the same, and means for elevating the machine at the side where the marking-wheel is located, substantially as set forth.

2. In combination with a corn-planter, the bar J, adapted to move vertically in bearings on said planter and provided with notched sides and a lever L, having bails o O adapted to engage said notched sides when the lever is vibrated, so that said bar can be elevated by the lever or depressed so as to raise the driving-wheel from the ground, substantially as set forth.

3. The combination, with a corn-planter, of a vertically-sliding bar having reversed ratchets on each side, and a lever provided with oppositely-acting bails alternately engaging said ratchets, substantially as set forth.

4. The combination, with a corn-planter, of a vertically-sliding bar having a slot, as described, and provided with alternately-arranged ratchets, and a lever provided with lower and upper bails alternately engaging said ratchets, one of the bails being provided with a hook to engage the slot, substantially as set forth.

5. The combination, with a corn-planter, of a vertically-sliding bar having a slot, as described, and provided with alternately-arranged ratchets, a lever provided with lower and upper spring-bails adapted to engage said ratchets, one of the bails being provided with a hook engaging said slot, and a coiled spring connecting said bails, together with operating connections, substantially as set forth.

In testimony whereof I affix my signature in presence of two witnesses.

ALBERT BLAKLEY.

Witnesses:
JOHN F. CHRISTY,
CHAS. A. HENRY.